United States Patent
Bridges et al.

(10) Patent No.: US 7,437,537 B2
(45) Date of Patent: Oct. 14, 2008

(54) METHODS AND APPARATUS FOR PREDICTING UNALIGNED MEMORY ACCESS

(75) Inventors: Jeffrey Todd Bridges, Raleigh, NC (US); Victor Roberts Augsburg, Cary, NC (US); James Norris Dieffenderfer, Apex, NC (US); Thomas Andrew Sartorius, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 11/062,221

(22) Filed: Feb. 17, 2005

(65) Prior Publication Data

US 2006/0184738 A1    Aug. 17, 2006

(51) Int. Cl.
*G06F 9/30* (2006.01)
*G06F 9/40* (2006.01)
*G06F 15/00* (2006.01)

(52) U.S. Cl. .................. 712/204; 712/245; 711/125

(58) Field of Classification Search ................. 711/125; 712/245, 204

See application file for complete search history.

(56) References Cited

U.S. PATENT DOCUMENTS

| 5,832,297 A * | 11/1998 | Ramagopal et al. ............. 710/5 |
| 5,835,967 A * | 11/1998 | McMahan .................... 711/213 |
| 5,875,324 A * | 2/1999 | Tran et al. .................... 712/238 |
| 6,112,297 A * | 8/2000 | Ray et al. .................... 712/225 |
| 6,349,383 B1 * | 2/2002 | Col et al. .................... 712/226 |
| 6,704,854 B1 * | 3/2004 | Meier et al. .................. 712/204 |
| 2001/0056531 A1 * | 12/2001 | McFarling ................... 712/239 |
| 2004/0064663 A1 * | 4/2004 | Grisenthwaite ............. 711/169 |

* cited by examiner

*Primary Examiner*—Eddie P Chan
*Assistant Examiner*—Idriss N Alrobaye
(74) *Attorney, Agent, or Firm*—Thomas Rouse; Nicholas J. Pauley; John L. Ciccozzi (57) ABSTRACT

In an instruction execution pipeline, the misalignment of memory access instructions is predicted. Based on the prediction, an additional micro-operation is generated in the pipeline prior to the effective address generation of the memory access instruction. The additional micro-operation accesses the memory falling across a predetermined address boundary. Predicting the misalignment and generating a micro-operation early in the pipeline ensures that sufficient pipeline control resources are available to generate and track the additional micro-operation, avoiding a pipeline flush if the resources are not available at the time of effective address generation. The misalignment prediction may employ known conditional branch prediction techniques, such as a flag, a bimodal counter, a local predictor, a global predictor, and combined predictors. A misalignment predictor may be enabled or biased by a memory access instruction flag or misaligned instruction type.

18 Claims, 3 Drawing Sheets

METHODS AND APPARATUS FOR PREDICTING UNALIGNED MEMORY ACCESS

BACKGROUND

The present invention relates generally to the field of processors and in particular to predicting an unaligned memory access in a pipelined processor.

Portable electronic devices have become commonplace. Two trends in portable electronic devices are increased functionality and decreased size. Increased functionality is facilitated by increased computing power provided by faster and more powerful processors.

As well as providing advanced features and functionality, portable electronic devices themselves continue to shrink in size and weight. One impact of this shrinking trend is the decreasing size of batteries used to power the processor and other electronics in the device. While increases in battery technology partially offset the problem, the decreasing size of batteries imposes a strict power budget on all portable electronic device electronics. A significant portion of the power budget of portable electronic devices is power consumed by the processor.

Hence, processor improvements that increase performance and decrease power consumption are desirable for many applications such as portable electronic devices. Commonly modern processors employ a pipelined architecture, where sequential instructions, each having multiple execution steps, are overlapped in execution. For maximum performance, the instructions should flow through continuously through the pipeline. Any situation that causes instructions to be flushed from the pipeline, and subsequently restarted, can detrimentally impact both performance and power consumption.

Some pipeline resources, such as queue locations for instruction status and tracking, are allocated as the instruction enters the pipeline. If it is discovered later in the pipeline that a single instruction requires more resources than originally allocated, subsequent instructions may need to be flushed to allow their resources to be reallocated to the instruction that needs them.

A memory access instruction loading or storing misaligned data from or to memory is one example of an instruction that may need more pipeline resources than were originally allocated to it, the discovery of which may not occur until deep in the pipeline. Misaligned data are those that, as they are stored in memory, cross a predetermined memory boundary, such as a word or half-word boundary. Due to the way memory is logically structured and addressed, and physically coupled to a memory bus, data that cross a memory boundary commonly cannot be read or written in a single cycle. Rather, two successive bus cycles may be required—one to read or write the data on one side of the boundary, and another to read or write the remaining data.

A memory access instruction—that is, a load or store instruction—to unaligned data must generate an additional instruction step, or micro-operation, in the pipeline to perform the additional memory access required by the unaligned data. However, the alignment of the data cannot be determined until the effective address of the memory access and the data size are known, which may occur only deep in the pipeline, in an execute stage. By the time the effective address is generated and the misalignment of the data is discovered, there may be insufficient pipeline control resources available to generate a micro-operation to perform the second memory access. In the case of such misalignment, the pipeline must be flushed of at least all following instructions, to free up such resources. The flushed instructions must then be re-fetched and re-executed in the pipeline, degrading processor performance and wasting power.

SUMMARY

Data misalignment for memory access instructions may be predicted early in the pipeline, prior to the instruction's effective address generation. Pipeline resources may be allocated and the pipeline controlled to create a second micro-operation. The second micro-operation is utilized to perform a second memory access cycle, required by the misaligned data.

The present invention relates in one embodiment to a method of processing a memory access instruction in an instruction execution pipeline. Misalignment for the memory access instruction is predicted, and at least one micro-operation is generated in the pipeline in response to the prediction, prior to effective address generation for the memory access instruction, the micro-operation performing a second memory access for misaligned data In another embodiment, the present invention relates to a pipelined processor. The processor includes an instruction execution pipeline comprising a plurality of pipe stages, and a misalignment predictor generating a prediction that a memory access instruction will access misaligned data. The processor additionally includes control logic generating an additional micro-operation in the pipeline for the memory access instruction, in response to the prediction, prior to generating an effective address for the memory access instruction.

DETAILED DESCRIPTION

Pipelining is a processor implementation technique whereby multiple instructions are simultaneously overlapped in execution. Each instruction in a typical architecture is typically executed in a plurality of execution steps, such as Fetch, Decode, one or more Execute steps, Memory Access, and Write-Back. A processor pipeline comprises a plurality of "pipe stages,". Each pipe stage, which commonly comprises logic and—storage, completes an execution step or part of an execution step of an instruction. The pipe stages are coupled together to form the pipeline. Instructions enter the pipeline and are successively processed in the pipe stages. Additional instructions enter the pipeline before previous instructions complete execution—hence, multiple instructions may be processed within the pipeline at any given time. This ability to exploit parallelism among instructions in a sequential instruction stream contributes significantly to improved processor performance. Under ideal conditions and in a processor that completes each pipe stage in one cycle, following the brief initial process of filling the pipeline, an instruction may complete execution every cycle.

Such ideal conditions are seldom realized in practice, due to a variety of factors including data dependencies among instructions (data hazards), control dependencies such as branches (control hazards), processor resource allocation conflicts (structural hazards), interrupts, cache misses, and the like. In addition, some instructions may require more than one pass through one or more of the pipe stages. In this case, the processor may generate multiple micro-operations for the instruction. As used herein, a micro-operation is a logical entity that occupies one pipe stage at a time, and flows through the pipeline. Ideally, most instructions comprise a single micro-operation in the pipeline (to approach the one-instruction-per-cycle goal). However, an instruction may comprise two or more micro-operations, or may be split into two or more, each of which flows through the pipeline sequentially.

One form of structural pipeline hazard arises from misaligned memory accesses. Many memory access instructions calculate an effective memory address—that is, the address from which data is loaded or to which data is stored—during an execution stage. However, processor resources—in particular, pipeline control resources that allocate pipe stages to instructions and track the instructions through the pipeline—are allocated to the load or store instruction during the decode stage. In the usual case of memory addresses being aligned on word, half-word, or other predetermined address boundaries, the load or store operation may be performed in a single pipe stage (although the pipeline may be halted while the data are retrieved from memory).

Figure 1:
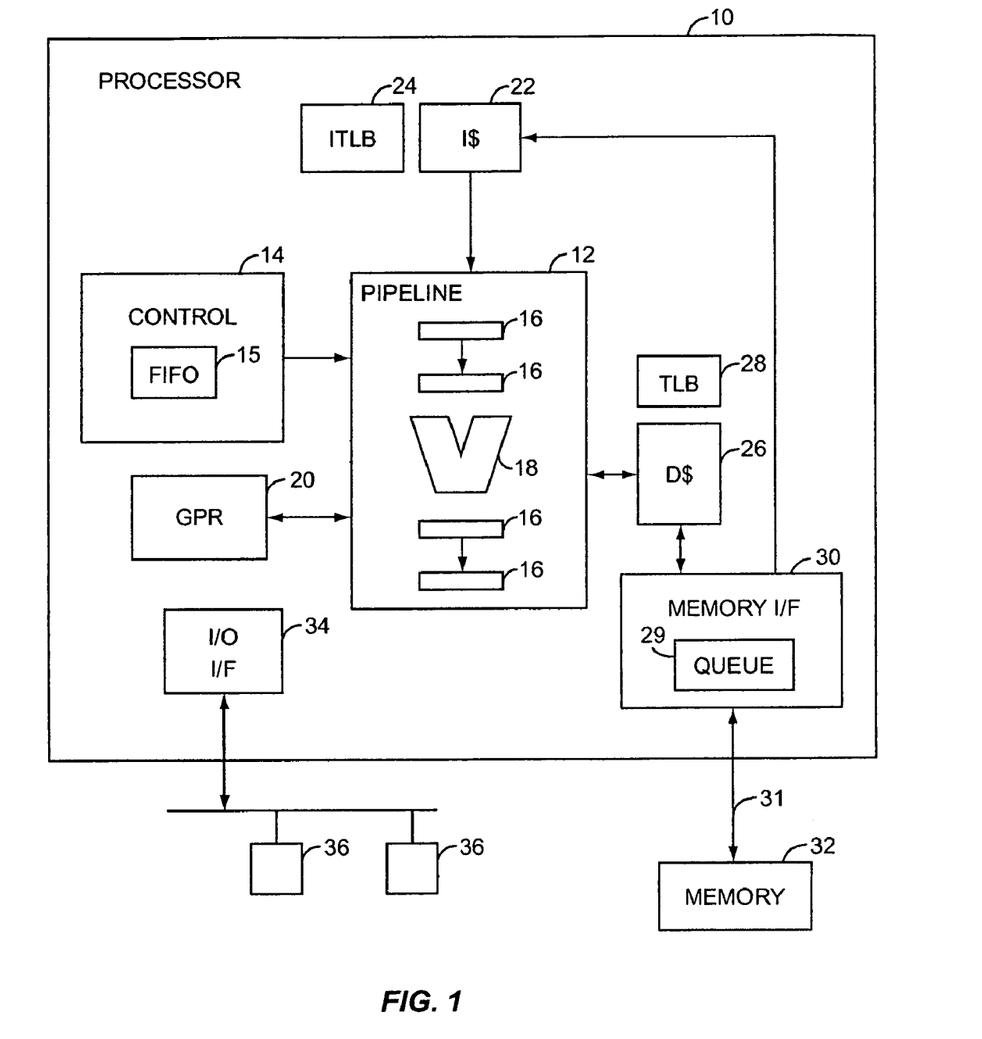
FIG. 1 is a functional block diagram of a processor.

D-cache 26 cause an access to main (off-chip) memory 32, under the control of a memory interface 30, which may include a cache miss processing queue 29. The processor 10 may include an Input/Output (I/O) interface 34, controlling access to various peripheral devices 36. Those of skill in the art will recognize that numerous variations of the processor 10 are possible. For example, the processor 10 may include a second-level (L2) cache for either or both the I and D caches. In addition, one or more of the functional blocks depicted in the processor 10 may be omitted from a particular embodiment.

Table 1 below depicts a diagram of a representative pipeline operation. Instructions in the representative architecture execute in six steps:

IF—Instruction Fetch
ID—Instruction Decode
EX1—Execution (Fetch Address Operands for Memory Access Instructions)
EX2—Execution (Effective Address Calculation for Memory Access Instructions)
MEM—Memory Access
WB—Write Back

TABLE 1

Representative Pipeline Operation

| Instruction Number | Clock Cycle | | | | | | | | | |
|---|---|---|---|---|---|---|---|---|---|---|
| | 1 | 2 | 3 | 4 | 5 | 6 | 7 | 8 | 9 | 10 |
| i | IF | ID | EX1 | EX2 | MEM | WB | | | | |
| i + 1 | | IF | ID | EX1 | EX2 | MEM | WB | | | |
| i + 2 | | | IF | ID | EX1 | EX2 | MEM | WB | | |
| i + 3 | | | | IF | ID | EX1 | EX2 | MEM | WB | |
| i + 4 | | | | | IF | ID | EX1 | EX2 | MEM | WB |

If a memory access instruction is directed to data that crosses the predetermined address boundary, two load or store operations are required, requiring two micro-operations in the pipeline to perform. However, most likely only one micro-operation was allocated to the load or store in the decode stage. The need to generate a new micro-operation in an execute stage of the pipeline is problematic. In the case of pipeline resources being fully allocated, the need for a new micro-operation will cause an exception, requiring all following instructions to be flushed from the pipeline to free up the necessary pipeline control resources.

FIG. 1 depicts a functional block diagram of a processor 10. The processor 10 executes instructions in an instruction execution pipeline 12 according to control logic 14, which may include an instruction execution FIFO 15. The pipeline includes various registers or latches 16, organized in pipe stages, and one or more Arithmetic Logic Units (ALU) 18. A General Purpose Register (GPR) file 20 provides registers comprising the top of the memory hierarchy. The pipeline fetches instructions from an Instruction Cache 22, with memory addressing and permissions managed by an Instruction-side Translation Lookaside Buffer (ITLB) 24. Data is accessed from a Data Cache 26, with memory addressing and permissions managed by a main Translation Lookaside Buffer (TLB) 28. In various embodiments, the ITLB may comprise a copy of part of the TLB. Alternatively, the ITLB and TLB may be integrated. Similarly, in various embodiments of the processor 10, the I-cache 22 and D-cache 26 may be integrated, or unified. Misses in the I-cache 22 and/or the If each pipe stage executes in one cycle, and if there are no pipeline stalls, hazards, or interrupts, from clocks six through ten one instruction completes and performs a write-back of its results in each cycle. Clock cycles one through four represent an initialization process of filling the pipeline, which is performed, for example, following a reset, context switch, interrupt or any other flush of the pipeline. As additional instructions follow the i+4$^{th}$, the one-instruction-per-cycle performance may continue indefinitely in the ideal case. The pipeline structure of Table 1 is representative only. In any given processor implementation, a pipeline may include any number of pipe stages for any instruction step.

Figure 2:
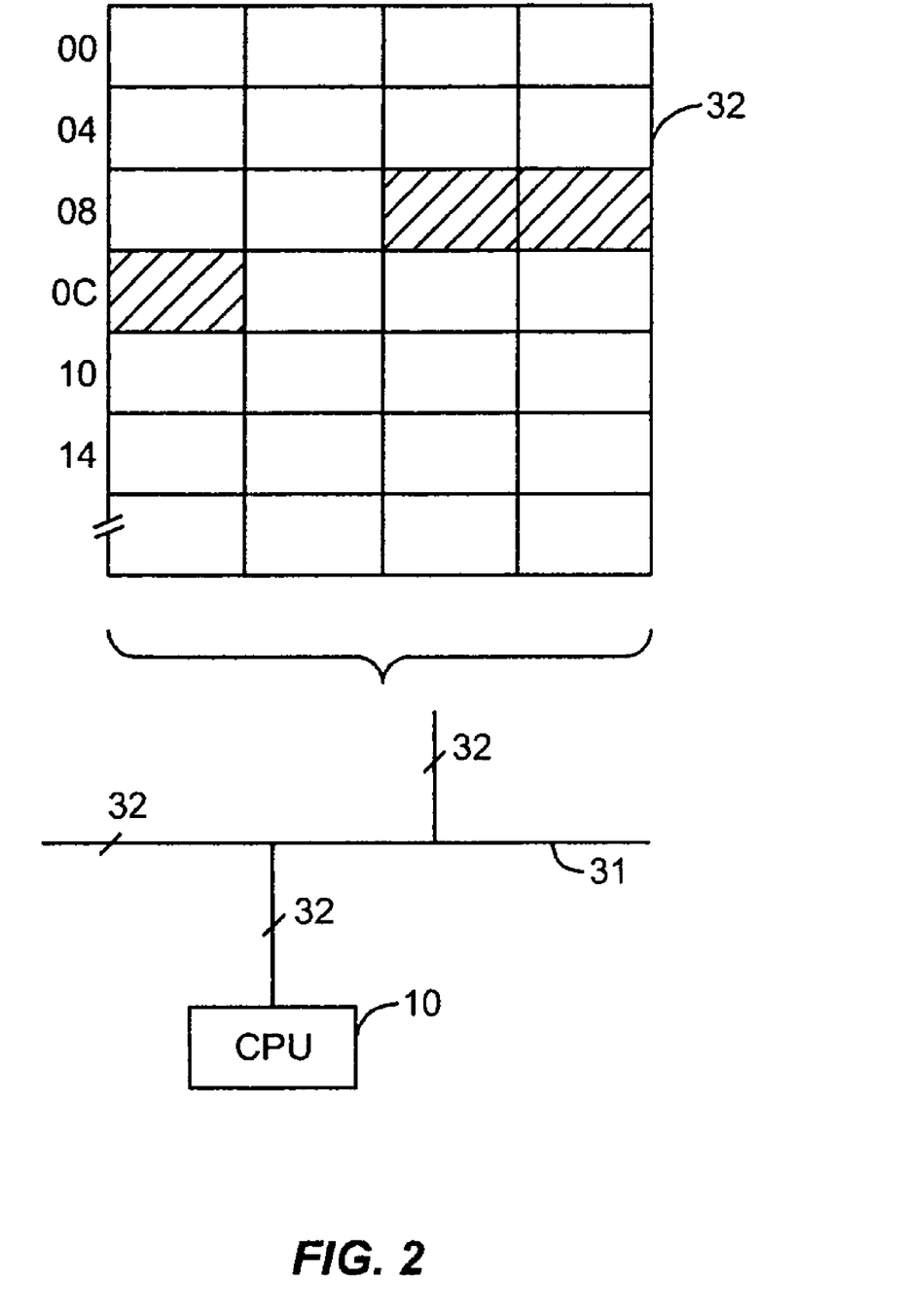
FIG. 2 is a diagram of memory organization.

Load (LD) and store (ST) instructions access memory to read and write data, respectively. The memory is organized to simultaneously access a predetermined amount of data at a time. FIG. 2 is a block diagram of one memory structure in an electronic device, including a processor 10, a bus 31 and memory 32. In this example, the bus 31 is 32 bits wide, and the memory 32 (which may comprise, for example, cache memory in the processor or off-chip RAM) is aligned on word (32-bit) boundaries. As will be readily apparent to one of skill in the art, numerous different bus and memory architectures may be implemented, with corresponding different data alignment boundaries.

As an example of an unaligned memory access, FIG. 2 depicts memory read by a LD instruction with an effective starting byte address of 0x0A, and a size field of three bytes. For word-aligned memory 32, this data cannot be read from the memory in one bus cycle. Rather, the processor 10 must first read the full word beginning at 0x08 (masking out bytes 0x08 and 0x09), and then read the full word beginning at 0x0C (masking out bytes 0x0D through 0x0F). In a system with double-word memory alignment and a 64-bit bus, this data could be read in a single cycle; however; a 3-byte datum beginning at 0x07 could not. In general, any real-world bus 31 and memory 32 configuration may give rise to the problem of unaligned memory accesses.

Because unaligned data require two bus cycles, a memory access instruction directed to unaligned data (referred to herein as an "unaligned memory instruction") will result in the creation, in the execute stage, of two micro-operations. For example, if the i+3$^{rd}$ instruction in Table 1 were an unaligned memory access instruction, the pipeline would perform as depicted in Table 2 below.

The misaligned memory access may also be described in more detail with reference to FIG. 3, a functional block diagram of part of an instruction pipeline 12. A LD instruction is fetched from the instruction cache 22 and loaded into the IF latch 40 in the pipeline. The instruction is decoded by decode logic 42. In one embodiment, the LD calculates an effective address by adding a base address, located in a first register r1, to an offset, located in a second register r2. The addresses of the two registers r1 and r2 and the size of the datum are decoded from the instruction and latched in the DCD latch 44. These register addresses may then index a register file, such as the GPR file 20, which returns the contents of the registers, denoted as (r1) and (r2). These values are stored in the EX1 latch 46, added by ALU 18, and an effective memory address is stored in the EX2 latch 48. A memory access then proceeds

TABLE 2

Representative Pipeline with Unaligned Memory Access Instruction

| Instr. No. | Clock Cycle | | | | | | | | | | |
|---|---|---|---|---|---|---|---|---|---|---|---|
| | 1 | 2 | 3 | 4 | 5 | 6 | 7 | 8 | 9 | 10 | 11 |
| i | IF | ID | EX1 | EX2 | MEM | WB | | | | | |
| i + 1 | | IF | ID | EX1 | EX2 | MEM | WB | | | | |
| i + 2 | | | IF | ID | EX1 | EX2 | MEM | WB | | | |
| i + 3 | | | | IF | ID | EX1 | EX2 | MEM | WB | | |
| (i + 3)$_2$ | | | (only if sufficient resources available) | | | | gen μ-op | EX2 | MEM | WB | |
| i + 4 | | | | | IF | ID | EX1 | (stall) | EX2 | MEM | WB |

The effective address for the memory access instruction i+3 is determined in clock cycle seven, during the EX2 stage. It is only at this point that the processor control logic can determine that the effective memory access is unaligned— that is, it crosses a predetermined memory boundary, and cannot be accessed in a single bus cycle. If sufficient pipeline resources are available, the processor will generate an additional micro-operation ("gen μ-op" in Table 2) for the memory access instruction, denoted as (i+3)$_2$. The initially allocated micro-operation and the new micro-operation then proceed sequentially through the remaining pipeline.

The original micro-operation, having computed the address of the first memory access at EX2, then accesses the first part of the addressed data at MEM, and writes the data at WB. The newly created micro-operation will calculate the address of the second memory access (e.g., by adding a one-word offset) at EX2 in clock cycle eight, then access the second part of the addressed data at MEM, and write the data at WB.

Instruction i+4 stalls in clock cycle eight, due to the additional micro-operation required by the misaligned data for instruction i+3. To implement this stall in the pipeline, the clocks to the EX1 latch must be gated, the outputs to the EX1 latch recycled to an multiplexer at the input to the EX1 latch, or some other mechanism must be employed to hold the EX1 contents through both clock cycles seven and eight. Similarly, a following instruction i+5 would stall at the DCD latch, and so on throughout the pipeline. Implementing this stall control presents design challenges, particularly when the need for the stall is only discovered late in the pipeline. Furthermore, the need to "recycle" the pipe stages—both for the memory access instruction at EX2 and for other instructions in preceding pipe stages—adds a multiplexer select delay on one or more critical paths, potentially decreasing performance by increasing the machine cycle time. Minimizing the events that can cause a pipeline stall improves performance.

at 50, accessing the data cache 26. If the access misses in the data cache 26, the memory access operation 50 will perform a address translations as necessary, and access off-chip memory 32, stalling the pipeline until the memory access is resolved. In any event, the memory access operation 50 returns the first portion of the unaligned data, which is stored in MEM latch 52.

Upon generation of the effective address at 48 by adding (r1) and (r2), control logic 14 inspects the effective address and size field, and detects for the first time that the memory access is unaligned. If sufficient processor resources are available, the effective address is "recycled" at the EX2 latch 48, as indicated by the arrow 54. The address is updated with a one-word offset, to generate an effective address for the second memory access. This adds a micro-operation to the pipeline; and no following instruction is allowed to proceed to the EX2 pipe stage. The second word is accessed at 50, and stored in MEM latch 52 as data extracted from the first word proceeds down the pipeline. The data may then be written to the GPR consecutively, or combined and then written, as appropriate.

Figure 3:
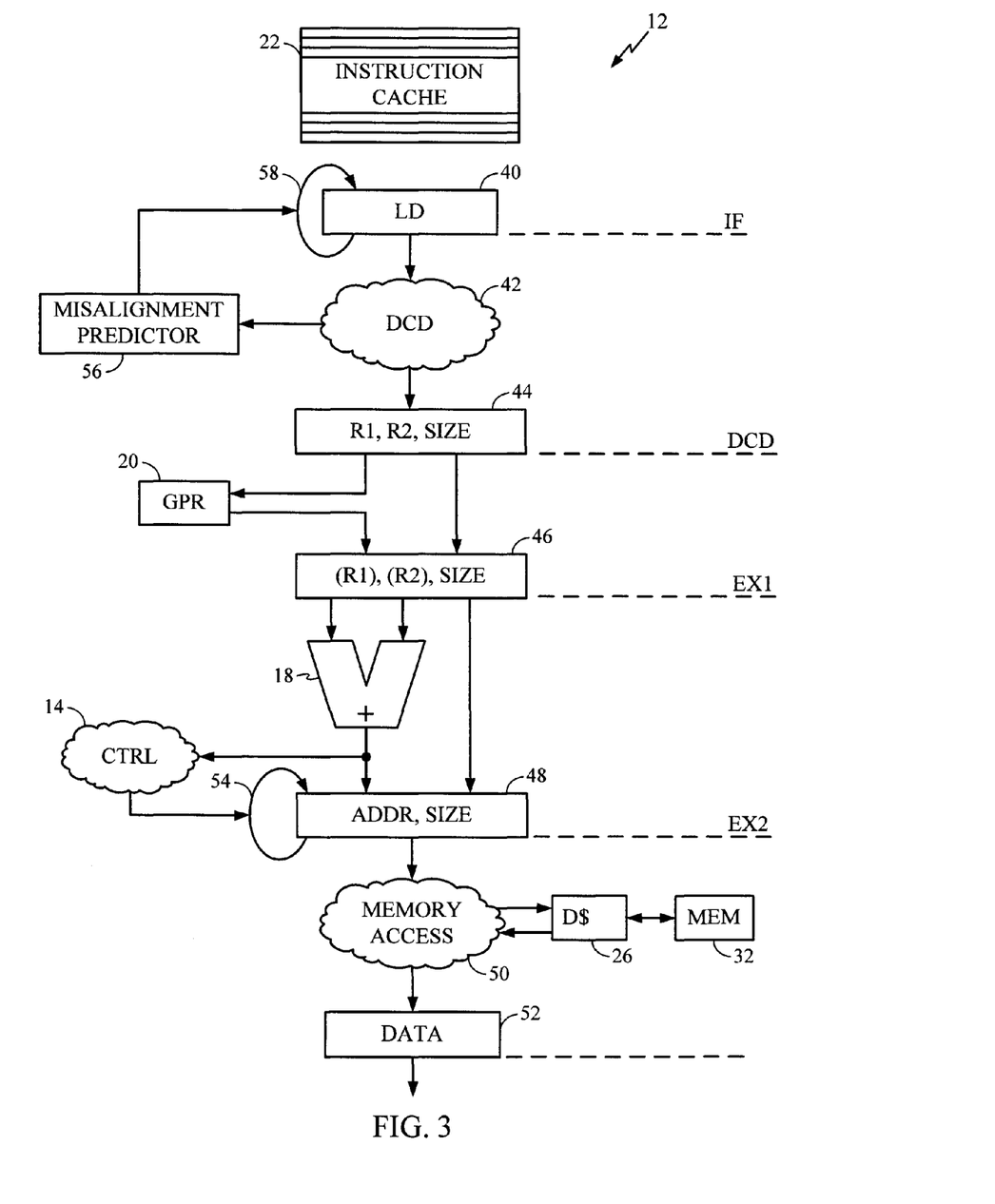
FIG. 3 is a functional block diagram of part of a processor pipeline.

Note that, for the purpose of explanation, FIG. 3 depicts each stage of the pipeline 12 with the relevant LD instruction step in that stage. In reality, once the relevant LD instruction step completes in a pipe stage and the corresponding micro-operation moves to a subsequent stage, another instruction's micro-operation is loaded into the pipe stage for processing. Thus, by the time an effective address for the LD instruction is latched at 48, the preceding three pipe stages are loaded with three micro-operations, which may correspond to up to three different instructions. By the time of effective address generation at EX2 latch 48, if insufficient pipeline control resources are available to cycle the address as depicted at 54 and generate a second micro-operation to perform a second memory access, a structural hazard is created and an exception will occur. In this case, all of the instructions behind the misaligned LD instruction must be flushed from the pipeline to make available the necessary control resources. These instructions must later be re-fetched and reprocessed, incurring both a performance penalty and wasting the power associated with performing the operations twice.

The pipeline control resources that must be available for the creation of the micro-operation in the EX2 pipe stage may include an entry in an instruction tracking FIFO 15 (FIG. 1). The instruction tracking FIFO 15 includes an entry for each issued instruction, in program order. Entries in the FIFO 15 are allocated when the corresponding instructions issue, and updated several cycles later, when the pipeline control logic 14 determines whether the instructions have exceptions that might cause an interrupt. Entries are removed from the instruction tracking FIFO 15 in order, popping each one off after it has been "confirmed" (i.e., the pipeline controller determines the instruction will complete execution with no exceptions) and "committed" (i.e., the pipeline controller has recognized that it and all of its predecessors have been confirmed, so the instruction is clear to complete execution in the pipeline).

If each entry in the instruction tracking FIFO 15 corresponds to a single micro-operation, the structure and control of the instruction tracking FIFO 15 is simplified. On the other hand, if an unaligned memory access instruction causes the generation of an additional micro-operation deep in the pipeline, such as in the EX2 pipe stage, then each entry in the instruction tracking FIFO 15 must be able to track multiple potential micro-operations, increasing the hardware resources and control complexity for each FIFO entry. This increased complexity and size is required for each FIFO entry, yet unaligned memory access instructions—the only instructions to require late, multiple micro-operation tracking—are relatively rare. As an alternative to designing the instruction tracking FIFO 15 to track multiple micro-operations per entry, each entry may track only one micro-operation. In this case, a late misaligned memory access instruction will cause the pipeline (and instruction tracking FIFO 15) to be flushed of all instructions behind it, two entries to be allocated in the instruction tracking FIFO 15, corresponding to two micro-instructions, and all following instructions re-fetched and re-issued. This incurs significant performance and power penalties.

In addition to the instruction tracking FIFO 15, another resource necessary for a misaligned memory instruction that may be unavailable late in the pipeline is an entry in a cache miss queue 29. When data accesses miss in the data cache, the access may be placed in a queue 29 to access main memory on the external bus. If there are no queue entries available, the pipeline must stall. In the case of a memory access instruction, the cache miss queue 29 may be checked during the DCD stage, and if an entry is available, control logic 14 allows the instruction to proceed, knowing a cache miss will not stall the pipeline 12. However, if an unaligned memory access instruction must generate an additional micro-operation late in the pipe, to perform an additional memory access, and if the memory access misses in the cache, a second cache miss queue entry is required. Since only one was reserved in the DCD pipe stage, insufficient queue resources may be available, causing the pipeline 12 to stall.

According to one embodiment of the present invention, the misalignment of data in a memory access instruction is predicted, and a micro-operation is created in response to the prediction, before the effective address generation for the memory access instruction. The new micro-operation performs the second memory access that is required to access the misaligned data. This allows pipeline control resources to be allocated early in the pipeline—such as immediately upon decoding the instruction.

Referring again to FIG. 3, a misalignment predictor 56 detects a memory access instruction as soon as the instruction is decoded at 42. In response to a misalignment prediction, a second micro-operation may be created immediately, as indicated by the LD instruction being "recycled" at IF latch 40. The second micro-operation will follow the primary load instruction micro-operation through the pipeline, and will be available to perform a second memory access cycle if the predicted misalignment of data is correct. The additional micro-operation need not actually perform the register accesses and address generation described above for the LD instruction, since the address of is memory access is known to be the same as that of the LD instruction, with, e.g., a one-word offset. Following a first memory access by the LD instruction at 50, if the misalignment prediction was correct, the address for the second memory access necessary to read the misaligned data is calculated and stored in the EX2 latch 48, when the first datum is stored in the MEM latch 52. A second memory access is then performed, and the second datum obtained from the cache 26 or memory 32, and loaded into the MEM latch 52.

If the misalignment prediction was erroneous, the second memory access is not performed, and the additional micro-operation is abandoned. In the event of a pipeline stall, an instruction following the LD may advance, consuming the resources allocated for the second micro-operation and effectively removing it from the pipeline.

Table 3 below depicts the pipeline where instruction i+3 is a misaligned memory access instruction for which the misalignment is correctly predicted.

TABLE 3

Rep. Pipeline with Correctly Predicted Unaligned Memory Access Instruction

| Instr. No. | Clock Cycle | | | | | | | | | | |
|---|---|---|---|---|---|---|---|---|---|---|---|
| | 1 | 2 | 3 | 4 | 5 | 6 | 7 | 8 | 9 | 10 | 11 |
| i | IF | ID | EX1 | EX2 | MEM | WB | | | | | |
| i + 1 | | IF | ID | EX1 | EX2 | MEM | WB | | | | |
| i + 2 | | | IF | ID | EX1 | EX2 | MEM | WB | | | |
| i + 3 | | | | IF | ID | EX1 | EX2 | MEM | WB | | |
| (i + 3)$_2$ | | (sufficient pipeline resources known to be available) | | | gen μ-op | ID | EX1 | EX2 | MEM | WB | |
| i + 4 | | | | | IF | (stall) | ID | EX1 | EX2 | MEM | WB |

In response to decoding the instruction as a LD and predicting a misalignment, a second micro-operation $(i+3)_2$ is generated in clock cycle five at the decode pipe stage. This early generation of the micro-operation—before the effective address of the LD instruction is calculated in the EX2 pipe stage at clock cycle seven—ensures that sufficient pipeline control resources are available for the micro-operation $(i+3)_2$. The timing of the instruction execution is otherwise similar to that of Table 2, which assumed the availability of sufficient resources for the creation of the second micro-operation $(i+3)_2$ in the EX2 pipe stage. One difference is that the instruction i+4 is stalled by the same amount, but the stall comes earlier in its execution sequence, as the micro-operation $(i+3)_2$ is generated earlier in the pipeline.

If the misalignment prediction is accurate, precisely the correct pipeline control resources are allocated for performing the misaligned memory access, and subsequent instructions may be loaded in to the pipeline and executed without fear of their being flushed due to the misalignment. If the misalignment prediction is erroneous, processor performance and power management degrade. The degradation in performance, however, is not symmetrical. Table 4 below depicts the relative performance and power impact for the misalignment prediction accuracy possibilities.

TABLE 4

Impact of Misalignment Prediction Accuracy

| Predicted | Actual | Impact | Comments |
|---|---|---|---|
| Aligned | Aligned | Optimal | This is the normal case, and should occur in 99+% of applications |
| Aligned | Misaligned | Potentially Terrible | Must take exception and flush pipe if insufficient resources available to generate micro-operation |
| Misaligned | Aligned | Bad | One-stage pipe bubble - unneeded micro-operation created at DCD |
| Misaligned | Misaligned | Optimal | Guarantee sufficient resources available for necessary micro-operation |

The correctly predicted cases provide optimum performance by allocating precisely the required number of micro-operations to the memory access instruction as needed to fully execute the instruction. The erroneously predicted case of predicted aligned but actually misaligned is described above, where data alignment is not checked until the effective address is generated for a memory access instruction—in the EX2 pipe stage in the example discussed above. As discussed, if sufficient pipeline control resources are available, the only performance degradation is an increased latency in completion of the instructions following the memory access instruction, as a micro-operation is created to perform a second memory access operation. However, if sufficient pipeline control resources are not available, an exception will occur, and the pipeline 12 will be flushed of all instructions loaded after the memory access instruction, to free up the necessary resources to create and manage an additional micro-operation. This is the worst possibility in terms of performance and power optimization.

The erroneously predicted case of predicted misaligned but actually aligned generates a superfluous micro-operation or "bubble" in the pipeline 12 following the memory access instruction. Once the effective address for the memory access instruction is generated and control logic 14 can detect that it is in fact aligned, the superfluous micro-operation may be abandoned. If, for example, the memory access instruction misses in the cache 26, forcing an access to off-chip memory 32, the pipeline 12 will be stalled pending the completion of the memory access operation. If another instruction behind the generated micro-operation does not encounter any hazards in the EX1 or EX2 pipe stages, it may advance to just behind the memory access instruction, making the bubble disappear. In this case, there is no performance degradation, although some power was wasted in creating and managing the micro-operation. In the more likely case that the memory access instruction hits in the cache 26 (and the pipeline 12 does not otherwise stall), the bubble will flow through the pipeline 12, causing a one-cycle performance degradation (assuming one cycle per pipe stage). However, an erroneously predicted misalignment will not cause an exception or flush the pipeline 12 for lack of necessary control resources.

The misalignment prediction may be performed in various other ways, some of which are disclosed herein. However, the present invention is not limited to the specific misalignment prediction algorithms disclosed. Prediction—by any means—of misalignment of a memory access instruction, and the generation of a micro-operation before the instruction's effective address generation, in response to the prediction, to access the misaligned data, is within the scope of the present invention.

Where misaligned data accesses are common, a reasonable trivial misalignment prediction algorithm may be simply to assume misaligned, and always generate an additional micro-operation before generating an effective address for a memory access instruction. This would guarantee no exception or pipeline flush due to the misalignment, at the price of a performance hit of one cycle per actually aligned memory access. According to one embodiment of the present invention, a "predict misaligned" mode is defined by a bit in a control register. When an application anticipates a large number of misaligned memory accesses, it may enable the mode by setting the bit. While the bit is set, all memory accesses are predicted to be misaligned. In another embodiment, misalignment prediction is controlled by attributes in the memory access instruction's page table, such that all memory accesses by instructions from a single page will be predicted the same way—aligned or misaligned.

Most code may not encounter misaligned memory accesses that are so readily identified as being within a particular segment of code or area of memory. Hence a more sophisticated method of misalignment prediction is desirable—a prediction that may be continuously enabled, but which does not blindly predict all memory accesses, or all on a particular page, will be misaligned. For example, in one embodiment the misalignment prediction may follow the stack pointer alignment. If the stack pointer is misaligned, memory accesses are predicted to be misaligned.

Methods of predicting the behavior of conditional branch instructions are well known, and many may be applicable to predicting misalignment. For example, recent past memory access patterns may be a good indicator of the alignment of future memory accesses. In one embodiment, a plurality of one-bit flags, indexed by address bits of memory access instructions, indicate the alignment of the most recent memory access by the corresponding instruction—for example, a one indicating a misaligned access, and a zero indicating an aligned access (or vice versa). The misalignment flags may include tags that compare all or a significant portion of the memory access instruction address to prevent misalignment aliasing among memory access instructions, which may lower prediction accuracy. Alternatively, to conserve resources, only the least significant few bits of the address may be used to index the misalignment flags.

Prior to generating the effective address of a memory access instruction, and preferably as early as possible, the corresponding misalignment flag is checked. If the most recent execution of the memory access instruction was misaligned, the pipeline controller may predict a pending access will also be misaligned, and generate a micro-operation to perform a second memory access. Since the type of instruction (i.e., memory access instruction) is first known in the instruction decode pipe stage, the micro-operation is preferably created there. However, the micro-operation may be created later in the pipeline. Any creation of a micro-operation prior to the generation of the effective address of a memory access instruction, in response to a misalignment prediction, is within the scope of the present invention.

One consequence of a single-bit misalignment flag is that an odd misaligned memory access instruction in a stream of aligned memory access instructions will mispredict twice—once when the misaligned instruction is first encountered, and again on the next, aligned execution of the instruction (whose misalignment flag is now set). A solution to this problem, also known in conditional branch prediction, is a bimodal misalignment predictor comprising a table of two-bit saturating counters, indexed by memory access instruction addresses. Each counter has one of four states:

11—Strongly misaligned
10—Weakly misaligned
01—Weakly aligned
00—Strongly aligned When the effective address for a memory access instruction is generated, the corresponding counter is updated. Misaligned memory access instructions increment the state towards strongly misaligned, and aligned memory access instructions decrement the state towards strongly aligned. Such a bimodal counter will only mispredict once on an odd misaligned access in a stream of aligned accesses, at the expense of mispredicting twice at the beginning of a stream of misaligned accesses.

Another misalignment prediction algorithm that may be borrowed from conditional branch prediction is a local misalignment predictor. A local misalignment predictor maintains two tables. The first table is a local misalignment history table. It is indexed by address bits of the memory access instruction, and it records the aligned/misaligned history of the n most recent executions of each memory access instruction. The other table is a pattern history table. Like the bimodal predictor, this table contains bimodal counters; however, its index is generated from the misalignment history in the first table. To predict an alignment, the misalignment history is looked up, and that history is then used to look up a bimodal counter that makes a misalignment prediction.

Still another option for predicting misalignments is a global misalignment predictor, which makes use of the fact that the behavior of many memory accesses is strongly correlated with the history of other recent memory accesses. A global misalignment predictor keeps a single shift register updated with the recent misalignment history of every memory access instruction executed, and uses this value to index into a table of bimodal counters.

Alternatively, the table of bimodal counters may be indexed with the recent misalignment history concatenated with a few bits of the address of the memory access instruction, known as the gselect predictor. Gselect may yield more accurate results than local prediction for small table sizes. As another alternative, the memory access instruction address may be XOR'ed with the global history, rather than concatenated, known as the gshare predictor. Gshare may yield more accurate misalignment predictions than gselect for large tables. Even if gselect and gshare are less accurate than local prediction, they may be preferred for implementation reasons. Gselect and gshare require a single table lookup per alignment prediction, where local prediction requires two table lookups in series.

In 1993, Scott McFarling proposed combining branch predictors in the Digital Western Research Laboratory Technical Note TN-36, "Combining Branch Predictors," incorporated herein by reference in its entirety. The techniques McFarling proposed may be advantageously applied to the problem of predicting misaligned memory accesses, to thereby generate a pipeline micro-operation prior to the effective address generation of a memory access instruction, according to the present invention.

In one embodiment, combined misalignment prediction uses three predictors in parallel: bimodal, gshare, and a bimodal-like predictor to pick which of bimodal or gshare to use on a per-memory-access instruction basis. The choice predictor is yet another 2-bit up/down saturating counter, in this case the MSB choosing the prediction to use. In this case the counter is updated whenever the bimodal and gshare predictions disagree, to favor whichever predictor was accurate.

In another embodiment, the misalignment predictor may maintain a misalignment cache, which may be fully associative or set associative, and may be indexed by part of the memory access instruction address, or part of that address concatenated or XOR'ed with other recent misalignment history, such as for the gselect and gshare parameters above. Early in the pipeline, such as during the instruction fetch pipe stage (e.g., before it is even known that the instruction is a memory access instruction), the cache may be indexed. If the misalignment cache hits, the memory access was recently misaligned, and may be predicted misaligned. If this cache access misses, the memory access is predicted aligned. Entries are added to the cache for unpredicted misaligned memory access instructions, and removed from the cache for aligned memory accesses that were predicted unaligned.

Various other misaligned prediction algorithms are possible. For example, the misalignment predictor may keep detailed statistics of the alignment behavior of memory access instructions, and predict misalignment based on a statistical average of past alignment experience, either per-instruction or globally. Similarly, the misalignment predictor may maintain a rolling average of the alignment of the n most recent memory access instructions.

Some instruction set architectures include static prediction bits in the opcode that can be specified by the programmer, based on his or her specific knowledge of the application. For example, if a branch is used in a "branch on error" situation, and errors are relatively rare, the programmer may statically predict those branches as "not taken." Similarly, a programmer may have insight into the memory alignment behavior of particular applications. For example, many data processing applications utilize well-designed and orderly data structures, and should expect few if any unaligned memory accesses. On the other hand, some applications may expect a high number of unaligned data accesses. Examples may include a communications program extracting specific data from a continuous data stream in a shared channel, or a data acquisition application logging data from a continuous output in response to an asynchronous trigger. In such applications, enabling misalignment prediction, or alternatively biasing misalignment prediction to a more aggressive mode, may improve processor performance and power conservation. According to one embodiment of the present invention, a programmer may influence the misalignment prediction behavior of a program via a flag in memory access instructions, or a set of unaligned memory access instructions.

In one embodiment, memory access instructions such as LD and ST instructions include a flag in the parameter list that indicates misalignment prediction should be performed. Alternatively, the instruction set may include new instructions such as LDMAL and STMAL for likely misaligned load and store operations, respectively. This flag or new instruction provides an input to the misalignment predictor 56 to enable memory alignment prediction, and the early generation of micro-operations prior to effective address generation, to perform additional memory access cycles to access unaligned data.

In another embodiment, the misalignment prediction flag or instruction type places the misalignment predictor 56 in a mode where it makes more aggressive misalignment predictions than it would without the flag. For example, the flag or instruction type may switch the misalignment predictor from using a two-bit bimodal saturation counter, as described above, to a three-bit saturation counter, wherein five or six of the eight states indicate degrees of predicted misalignment. One advantage of such a misalignment prediction flag or instruction type is that it places control of misalignment prediction in the programmer, who by virtue of his or her knowledge of application behavior may be better able to predict when misalignment prediction may lead to processor performance and power management improvements.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of processing a memory access instruction that performs a first memory access in an instruction execution pipeline, the method comprising:
predicting data misalignment for said memory access instruction during a decode stage of the instruction execution pipeline prior to fetching address operands for the memory access instruction,
wherein predicting data misalignment for said memory access instruction comprises setting a misalignment prediction bit in a control register, such that while said bit is set, all memory access instructions are predicted as misaligned; and
generating at least one micro-operation in said pipeline in response to said prediction,
said micro-operation performing a second memory access for misaligned data.

2. The method of claim 1 wherein generating at least one micro-operation in said pipeline comprises generating said micro-operation in an instruction decode pipe stage.

3. The method of claim 1 wherein generating at least one micro-operation comprises allocating pipeline control resources for said micro-operation.

4. The method of claim 3 wherein said pipeline control resources include at least one entry in an instruction tracking FIFO.

5. The method of claim 3 wherein said pipeline control resources include an available slot in a cache miss queue.

6. A pipelined processor, comprising:
an instruction execution pipeline comprising a plurality of pipe stages;
a misalignment predictor configured to generate a prediction, during a decode stage of the instruction execution pipeline, that a memory access instruction will access misaligned data prior to fetching address operands for the memory access instruction,
wherein the misalignment predictor comprises setting a misalignment prediction bit in a control register, such that while said bit is set, all memory access instructions are predicted as misaligned; and
control logic generating, in response to said prediction, an additional micro-operation in said pipeline to perform an additional memory access, prior to generating an effective address for the memory access instruction.

7. The processor of claim 6 wherein said additional micro-operation is generated in an instruction decode pipe stage.

8. The processor of claim 6 wherein said micro-operation occupies at least one said pipe stage.

9. The processor of claim 6 wherein said misalignment predictor includes memory storing the memory access instruction alignment history.

10. The processor of claim 6 further comprising an instruction execution FIFO, and wherein said control logic generates an entry in said instruction execution FIFO corresponding to said micro-operation.

11. A method of processing a memory access instruction that performs a first memory access, in an instruction execution pipeline, the method comprising:
predicting data misalignment for said memory access instruction during a decode stage of the instruction execution pipeline prior to obtaining address operands associated with generation of an effective memory access instruction,
wherein predicting data misalignment for said memory access instruction comprises setting a misalignment prediction bit in a control register, such that while said prediction bit is set, all memory access instructions are predicted as misaligned; and
generating at least one micro-operation in said pipeline in response to said prediction, said at least one micro-operation performing a second memory access for misaligned data.

12. The method of claim 11 wherein generating the at least one micro-operation in said pipeline comprises generating said micro-operation in an instruction decode pipe stage.

13. The method of claim 11 wherein generating at least one micro-operation comprises allocating pipeline control resources for said micro-operation.

14. A pipelined processor, comprising:
an instruction execution pipeline comprising a plurality of pipe stages;
a misalignment predictor configured to generate a prediction, during a decode stage of the instruction execution pipeline, that a memory access instruction will access misaligned data prior to obtaining address operands associated with generation of an effective memory access instruction,
wherein the misalignment predictor comprises setting a misalignment prediction bit in a control register, such that while said bit is set, all memory access instructions are predicted as misaligned; and control logic generating, in response to said prediction, an additional micro-operation in said pipeline to perform an additional memory access, prior to generating an effective address for the memory access instruction.

15. The processor of claim 14 wherein said additional micro-operation is generated in an instruction decode pipe stage.

16. The processor of claim 14 wherein the additional micro-operation occupies at least one of the plurality of pipe stages.

17. The processor of claim 14 wherein said misalignment predictor includes memory storing the memory access instruction alignment history.

18. The processor of claim 14 further comprising an instruction execution first in first out (FIFO) buffer, and wherein said control logic generates an entry in said instruction execution FIFO buffer corresponding to the additional micro-operation.

* * * * *